(12) United States Patent
Nomura

(10) Patent No.: US 7,841,943 B2
(45) Date of Patent: Nov. 30, 2010

(54) VIDEO GAME PROCESSING APPARATUS, A METHOD AND A COMPUTER PROGRAM PRODUCT FOR PROCESSING A VIDEO GAME

(75) Inventor: Tetsuya Nomura, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 152 days.

(21) Appl. No.: 11/741,221

(22) Filed: Apr. 27, 2007

(65) Prior Publication Data

US 2007/0265047 A1 Nov. 15, 2007

(30) Foreign Application Priority Data

May 1, 2006 (JP) ............................. 2006-127877

(51) Int. Cl.
*A63F 9/14* (2006.01)
*A63F 9/24* (2006.01)

(52) U.S. Cl. .............................. 463/30; 463/31; 463/32; 463/43

(58) Field of Classification Search ..................... 463/1, 463/8, 30, 31, 32–34, 38, 40, 43
See application file for complete search history.

(56) References Cited

U.S. PATENT DOCUMENTS

| | | | |
|---|---|---|---|
| 5,390,937 A | 2/1995 | Sakaguchi et al. | |
| 5,649,862 A | 7/1997 | Sakaguchi et al. | |
| 6,283,861 B1 | 9/2001 | Kawai et al. | |
| RE37,948 E | 12/2002 | Sakaguchi et al. | |
| 6,533,663 B1 | 3/2003 | Iwao et al. | |
| 6,544,123 B1 * | 4/2003 | Tanaka et al. | ................. 463/36 |

FOREIGN PATENT DOCUMENTS

| | | |
|---|---|---|
| JP | 6-105959 | 4/1994 |
| JP | 2000-284879 | 10/2000 |

OTHER PUBLICATIONS

Secrets of Mana—Instruction Booklet for Super Nintendo—http://www.replacementdocs.com/download.php?view.1268- 1993.*

(Continued)

*Primary Examiner*—Dmitry Suhol
*Assistant Examiner*—Damon Pierce
(74) *Attorney, Agent, or Firm*—Greenblum & Bernstein P.L.C.

(57) ABSTRACT

An added value is set to a battle tool for customizing the battle tool stored as battle tool information in a battle tool information managing table in response to customization request by operations of a player. A plurality of battle tools are stored in the battle tool information managing table. A player character can be equipped with any of the battle tools among the plurality of battle tools. When the battle tool information Is read out from the battle tool information managing table in response to display request of a battle tool, a display apparatus is caused to display one or more battle tool in a battle screen. The battle tool information thus read out indicates the one or more battle tool. The player character is equipped with a battle tool with which the player character can be equipped among the one or more battle tool thus displayed.

20 Claims, 10 Drawing Sheets

OTHER PUBLICATIONS

Japanese Patent Publication, JP, 2000-284879, English translation.*
English language Abstract of JP 2000-284879.
Rachet and Clank 3: Attack of the Galactic Rangers Official Guide Book, first edition, p. 17, Jan. 10, 2005, Shogakukan.
Final Fantasy VII Kaitaishinsho—the complete (improved edition)~, fourth printing, pp. 37-38, Aug. 31, 1998, ASCII Inc.
English Language Abstract of JP 6-105959.
"Seiken Densetsu II (Holy Sword Legend)", Aug. 30, 1993, NTT Publishing Co., Ltd., p. 12, together with an English language partial translation thereof.
NTT Publishing: "Seiken Densetsu II (The Secret of Mana / Holy Sword Legend)—Manual p. 21 "Weapons Ring"" [Online] Aug. 30, 1993, NTT Publishing Co., Ltd., Retrieved from the Internet: URL:http://secretofmana.planets.gamespy.com/instructions.html (retrieved on Aug. 27, 2007), XP00248499.
European Office Action dated Jan. 10, 2008, issued with respect to family member European Patent Application No. 07008712.7.

* cited by examiner

FIG. 3

| | Name | Customizing Item 1 | Customizing Item 2 | Customizing Item 3 | . . . | Offensive Power | Defensive Power |
|---|---|---|---|---|---|---|---|
| A | Sword (Long) | Silver Hilt | Ruby Ring | Slip Resistance | | 50 | 30 |
| B | Sword (Short) | Gold Hilt | Sapphire Sheath | | | 20 | 10 |
| C | Axe | Steel Weight | | | | 40 | 20 |
| D | Handgun | Automatic Pointing | Long Barrel | | | 50 | 5 |
| E | Machine Gun | Automatic Pointing | | | | 60 | 5 |
| F | Spear | Steel Shaft | | | | 20 | 20 |

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-127877, filed on May 1, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the characters displayed on the image display screen in response to operation(s) by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

Part of the appeal of a RPG is generally a scene in which a player character acting in response to operations by the player executes a battle against an enemy character thwarting accomplishment of a predetermined object in the RPG. In a conventional battle scene, actions of the player character and the enemy character are alternately executed one by one. For this reason, realism (realistic sensation) of an action scene (in particular, a battle scene) was low.

Further, the player character can select a weapon to be used when the player character attacks an enemy character among multiple kinds of weapons. However, a menu screen for setting a weapon must be displayed in order to select any weapon, and the player is require to set selection of the weapon on the menu screen. For this reason, such an operation (selection of the weapon) also results in one cause of a deterioration of realism (realistic sensation) of an action scene.

Moreover, the player can arbitrarily customize such a weapon by means of addition of an item, for example. Since the battle scene in a conventional RPG proceeds only by selecting some action patterns such as "battle", which are set in advance, as an "action command", it is important for the player to "cause the player character to utilize any weapon" and "cause the player character to execute any action". For this reason, it is no need to display customization information for a weapon to be utilized in the battle scene visually. Thus, in the conventional RPG, such a display process has not been executed.

In order to solve this problem, Japanese Patent Application Publication No. 6-105959 discloses that an enemy character attacks a game character when specific setting time for the enemy character elapses without stopping lapse of time even while the player inputs a command for the game character. Specifically, in this patent application publication, it is adopted a gauge gradually filling in accordance with lapse of time during a battle between the game character and the enemy character. The player can input a command for the game character when the gauge is full. Thus, realism (realistic sensation) of a battle scene is improved.

Further, in order to solve troublesomeness to display a dedicated menu screen every time for selection of a weapon, it has been proposed a method of displaying selectable weapons as icons around a player character in a ring-like manner (see "*Seiken Densetsu II* (*Holy Sword Legend*)", Aug. 30, 1993, NTT Publishing Co., Ltd., P. 12) (hereinafter, referred to as a "non-patent document"). According to the method, it is possible to improve visibility of the player compared with a method of text displaying a weapon name of each of weapons, whereby the player can select a desired weapon in a short time. Thus, it is possible to improve operability of a RPG for the player.

In the case where the technique disclosed in the documents described above is utilized, realism (realistic sensation) of a battle scene in a RPG can be heightened, and this makes it possible to increase interest of the player in the RPG.

However, in the technique disclosed in the non-patent document, a list of selectable weapons are just displayed around the player character as icons in place of opening of the menu screen. Architecture that the player character is caused to execute an arbitrary action by inputting a command after any one is selected from the displayed weapons has not changed basically. In other words, an icon display is merely adopted in place of new opening of a menu screen. For this reason, there has been a problem that the player is still forced to carry out troublesome operations and the player cannot feel high realistic sensation.

SUMMARY OF THE INVENTION

It is one object of the present invention to solve the problems described above and to provide a video game processing apparatus, a method and a computer program product for processing a video game by which a player is allowed to select a weapon for a player character without displaying weapons on a menu screen, and he selected weapon can be utilized in real time and immediately. Thus, it is possible to mainly heighten realism in a battle scene in a RPG (video game), and this makes it possible to improve interest of the player in the RPG.

In order to achieve the above object, one aspect of the present invention is directed to a video game processing apparatus that causes an image display apparatus to display a player character on an image display screen of the image display apparatus. The video game processing apparatus controls progress of the video game by controlling an action of the player character to be displayed on the image display screen in accordance with operations by a player. The video game processing apparatus of the present invention includes a value added setter that sets an added value to a battle tool for customizing the battle tool stored as battle tool information in a battle tool information managing table in response to customization request by operations of the player, a plurality of battle tools being stored in the battle tool information managing table, the player character being able to be equipped with any of the battle tools.

The video game processing apparatus also includes a battle tool display controller that reads out the battle tool information from the battle tool information managing table in response to display request of a battle tool by operations of the player, the battle tool display controller causing the display apparatus to display one or more battle tool in a battle screen displayed on the image display screens the battle tool information thus read out indicating the one or more battle tool.

The video game processing apparatus also includes a battle tool equipper that equips the player character with a battle tool with which the player character can be equipped among the one or more battle tool displayed by the battle tool display controller.

Since the video game processing apparatus may have the configuration described above, it is possible to select a battle tool such as a weapon without displaying a menu screen, and this makes it possible to use the selected battle tool in real time and immediately. Further, it is possible to heighten realism in a battle scene in the video game such as a RPG, and this makes it possible to improve interest of the player in the video game. Moreover, it is possible to reflect the battle tool customized by the player in the battle screen, and this makes it possible to increase interest of the player in the video game.

It is preferable that the one or more battle tool includes a plurality of battle tools, and the battle tool display controller causes the display apparatus to display the plurality of battle tools at the same time in response to display request of the battle tool by operations of the player. In the conventional video game apparatus, the number of battle tools such as weapons that the player can select at one attack is limited to only one kind, and the player is required to instruct to change weapons on the menu screen in the case where the weapon is to be changed to another. However, since the plurality of weapons are displayed on the battle screen a the same time in the video game processing apparatus of the present invention, it is possible to shift (change) a weapon to another weapon smoothly without bringing up the menu screen. This makes it possible to heighten realism (realistic sensation) of the video game.

It is preferable that the video game processing apparatus further includes a display state setter that sets a display state of a battle tool when the battle tool is displayed in the battle screen in response to request to set a display state by operations of the player. In this case, the battle tool display controller causes the display apparatus to display the battle tool in the battle screen with the display state set by the display state setter. By constructing the video game processing apparatus in this manner, riot only it is possible to bring up the plurality of battle tools in the battle screen at the same time, but also the player can arbitrarily execute a setup as to "in what display state the battle tools are displayed". Thus, it is possible to add a new wrinkle to the battle scene in the RPG, for example.

It is preferable that the display state setter determines an arrangement pattern to be utilized among a plurality of arrangement patterns for specifying an arrangement position of each of the battle tools, the arrangement pattern indicating -that the plurality of battle tools are displayed in the battle screen with a predetermined positional relationship, and that the battle tool display controller causes the display apparatus to display the plurality of battle tools in the battle screen on the basis of the arrangement pattern determined by the display state setter. By constructing the video game processing apparatus in this manner, the player can arbitrarily execute a setup as to in what arrangement pattern the battle tools are displayed. Thus, by arranging the battle tools in advance in accordance with a battle style desired by the player, it is possible to cause the player character to act in the battle scene effectively, and this makes it possible to heighten interest of the player in the video game.

It is preferable that the battle tool display controller causes the display apparatus to display the plurality of battle tools at respective display positions in the battle screen based on a display position of the player character in accordance with the arrangement pattern determined by the display state setter, and then to maintain the respective display positions of the plurality of battle tools even in the case where the player character moves in the battle screen. By constructing the video game processing apparatus in this manner, the player can equip the player character with any battle tool to battle an enemy character by appropriately changing one another in the plurality of the battle tools displayed in the battle screen in accordance with the arrangement pattern selected by the player himself. Therefore, for example, the player character can battle enemy characters while changing the battle tools by moving between the plurality of displayed battle tools. In particular, a skilled player can enjoy close direction effect of sword fight.

Alternatively, it is preferable that the battle tool display controller causes the display apparatus to display the plurality of battle tools at respective display positions in the battle screen based on a display position of the player character in accordance with the arrangement pattern determined by the display state setter, and then to move the respective display positions of the plurality of battle tools along with movement of the player character when the player character moves in the battle screen. By constructing the video game processing apparatus in this manner, it is possible to constantly arrange the battle tools near the player character even when the player character moves, and this makes it possible to increase variation of the video game.

It is preferable that arrangement position information is set in each of the plurality of arrangement patterns, the arrangement position information indicating an arrangement position of each of the plurality of battle tools based on a display position of the player character. By constructing the video game processing apparatus in this manner, it is possible to arrange the respective battle tools based on the display position of the player character.

It is preferable that the battle tool display controller includes a battle tool display position calculator that calculates a display position of each of the plurality of battle tools based on the display position of the player character in the battle screen in accordance with the arrangement position information set in the arrangement pattern. By constructing the video game processing apparatus in this manner, it is possible to determine (derive) the display position of each of the battle tools on the basis of the display position of the player character.

It is preferable that a standard point of the display position of the player character includes a specific point on a central axis of the player character and a point at which a specific part of the player character such as the tip of a finger of a dominant hand is positioned. In the case where a standard point of the display position of the player character is set to a point at which a specific part of the player character such as the tip of a finger of a dominant hand is positioned, the battle tool nearest from the tip of a finger of the extended hand is selected and equipped for the player character when the player character extends his hand to grab a battle tool. Thus, it is possible to expect an image having reality.

It is preferable that the video game processing apparatus further includes: an equipment request receiver that receives equipment request of a battle tool by operations of the player; and an equipped possible battle tool annunciator that announces that the player character can be equipped with a predetermined battle tool in the case where the predetermined battle tool is displayed within a predetermined distance from a display position of the player character and is the nearest battle tool from the display position of the player character. In this case, the equipment request receiver can receive equipment request of only a battle tool announced by the equipped possible battle tool annunciator as the equipment request of a battle tool with which the player character can be equipped, and the battle tool equipper equips the player character with the battle tool for which the equipment request receiver receives the equipment request. By constructing the video game processing apparatus in this manner, the player character can be equipped with the battle tool that is displayed within a predetermined distance from a display position of the player character and is the nearest battle tool from the display position of the player character.

It is preferable that the equipment request of the battle tool by operations of the player is an operation signal inputted from an operation input device by means of an operation of a specific button.

Further, in another aspect of the present invention, the present invention is directed to a method of processing a video game by causing an image display apparatus to display a player character on an image display screen of the image display apparatus. In this case, the method controls progress of the video game by controlling an action of each character to be displayed on the image display screen in accordance with operations by a player. The method of the present invention includes setting an added value to a battle tool for customizing the battle tool stored as battle tool information in a battle tool information managing table in response to customization request by operations of the player, a plurality of battle tools being stored in the battle tool information managing table, the player character being able to be equipped with any of the battle tools.

The method also includes reading out the battle tool information from the battle tool information managing table in response to display request of a battle tool by operations of the player, and causing the display apparatus to display one or more battle tool in a battle screen displayed on the image display screen, the battle tool information thus read out indicating the one or more battle tool.

The method also includes equipping the player character with a battle tool with which the player character can be equipped among the one or more battle tool thus displayed.

Moreover, still another aspect of the present invention is directed to a computer program product for processing a video game. In this case, progress of the video game is controlled by causing an image display apparatus to display a player character on an image display screen of the image display apparatus, and controlling an action of each character to be displayed on the image display screen in accordance with operations by a player. The computer program product of the present invention causes a computer to execute steps including setting an added value to a battle tool for customizing the battle tool stored as battle tool information in a battle tool information managing table in response to customization request by operations of the player, a plurality of battle tools being stored in the battle tool information managing table, the player character being able to be equipped with any of the battle tools.

The steps also include reading out the battle tool information from the battle tool information managing table in response to display request of a battle tool by operations of the player, and causing the display apparatus to display one or more battle tool in a battle screen displayed on the image display screen, the battle tool information thus read out indicating the one or more battle tool.

The steps also include equipping the player character with a battle tool with which the player character can be equipped among the one or more battle tool thus displayed.

According to the present invention, it is possible to select a battle tool such as a weapon without displaying a menu screen, and this makes it possible to use the selected battle tool in real time and immediately. Further, it is possible to heighten realism in a battle scene in the video game such as a RPG, and this makes it possible to improve interest of the player in the video game. Moreover, it is possible to reflect the battle tool customized by the player in the battle screen, and this makes it possible to increase interest of the player in the video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is an explanatory drawing that shows an example of a weapon information managing table.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
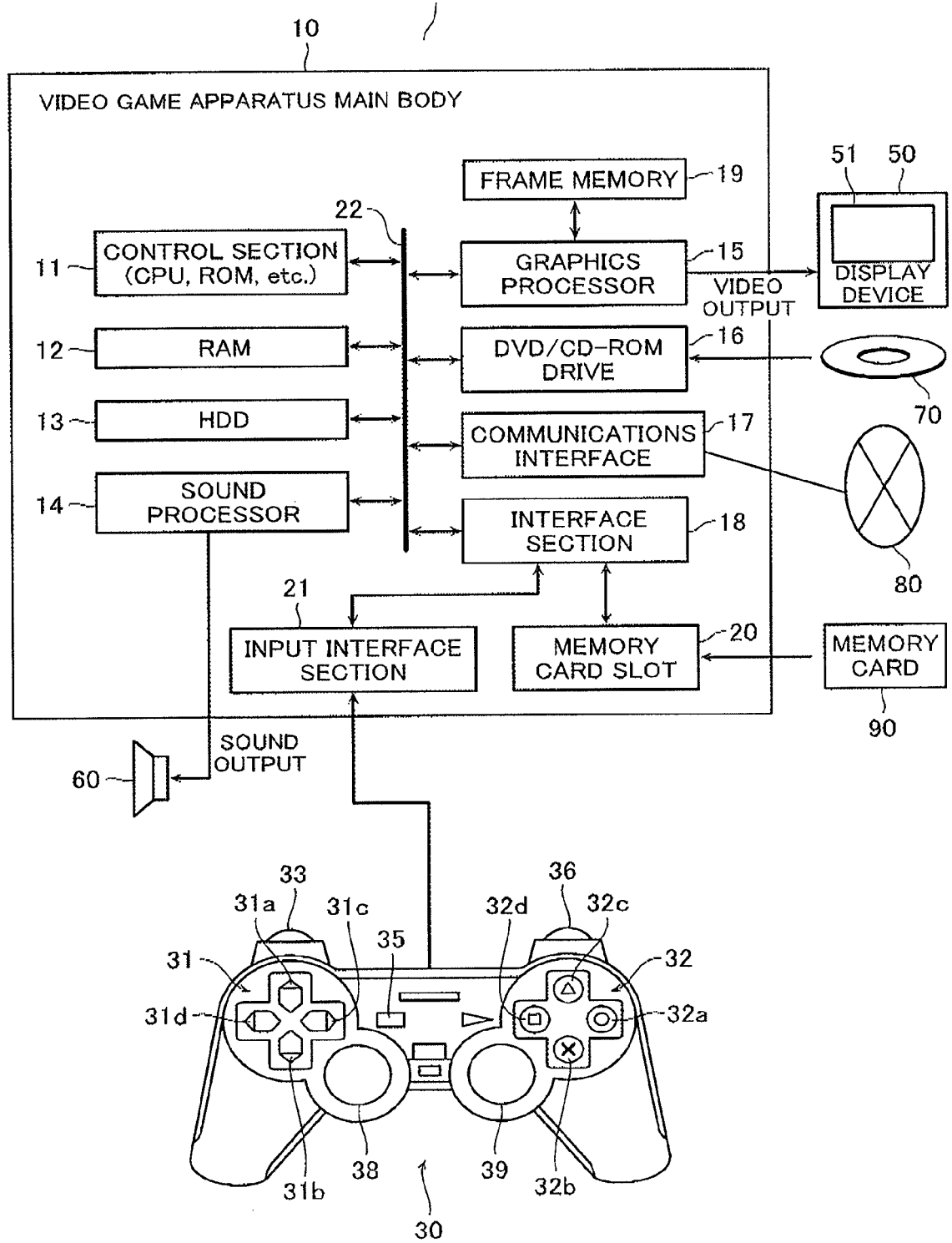
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention. As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micromirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption. The RAM 12 is used as a work area for the control section 11. The HDD 13 is a storage area for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21 and the memory card slot 20 is connected to the interface section 18. The interface section 18 causes instruction data from the input interface section 21 to be stored in the RAM 12 on the basis of operation(s) of a controller device such as a keypad 30 by a player of the video game apparatus 100. In response to the instruction data stored in the RAM 12, the control section 11 executes various arithmetic processing.

The video game apparatus main body 10 is connected to the controller device such as the keypad 30 as an operation input section (controller) via the input interface section 23. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d. The group of buttons 32 includes a circle button 32a, an X button 32b, a triangle button 32c and a square button 32d. Further, a select button 35 is arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 is provided with multiple switches respectively connected to the cross key 31, the circle button 32a, the X button 32b, the triangle button 32c, the square button 32d, the select button 35, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (that is, a character that moves in accordance with the operation of the keypad 30 by the player), move on a field provided in a virtual three-dimensional space, by which the video game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that only a single player character and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
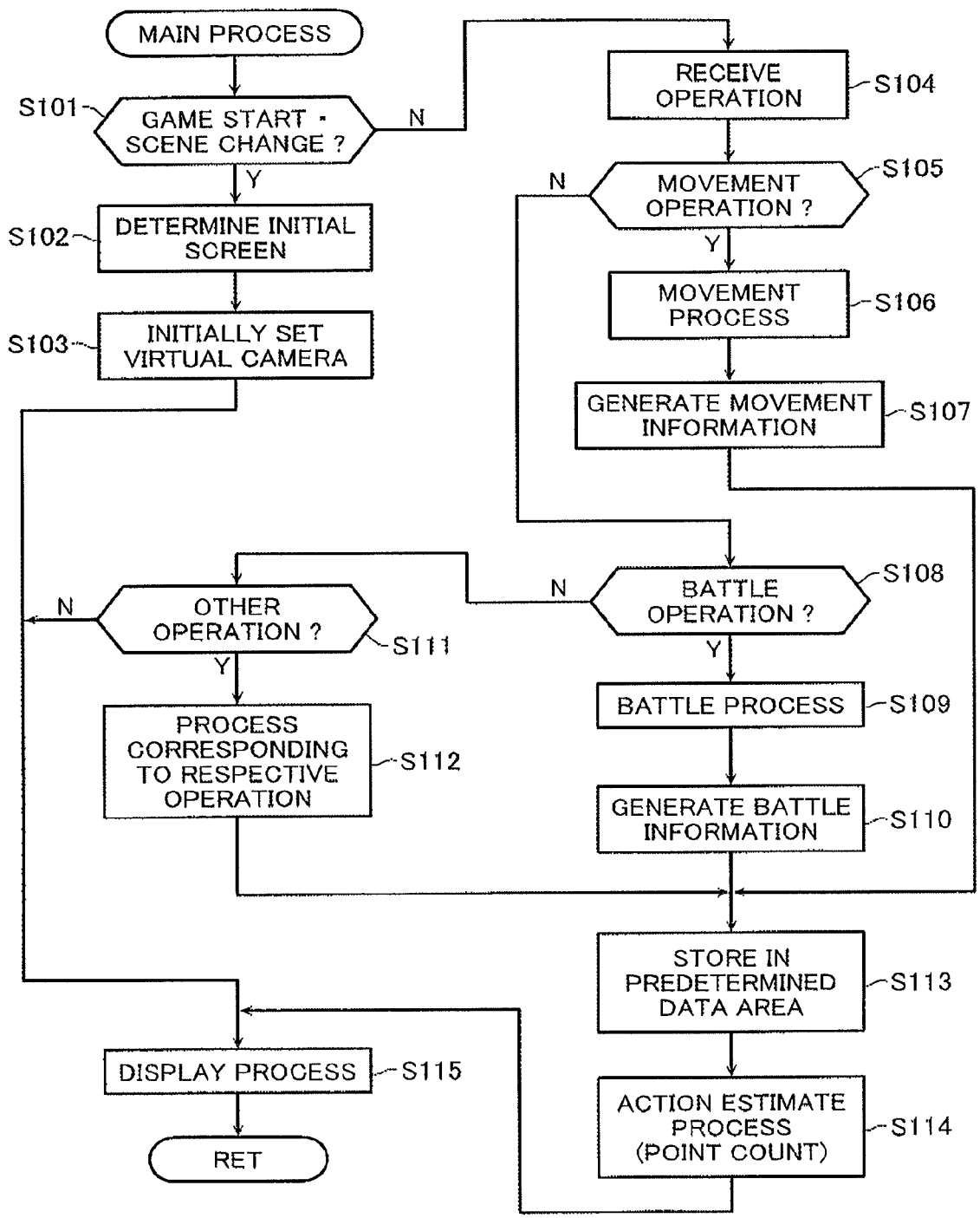
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is executed in accordance with a timer interruption at every 1/30 second. However, it is to be noted that timing of "at every 1/30 second" is only one example, as mentioned above. Instead, for example, the main process may be executed in accordance with a timer interruption at every single field period (every 1/60 second) or at every two frame periods (every 1/15 second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character and a battle by the player character, are allowed. In the case where a predetermined object in the field is accomplished, one stage may be terminated and the processing may proceed to another stage executed in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the keypad 30, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102). In this case, various data, such as image data used for the video game and characters, are stored in the storage medium 70. At Step S102, an initial display position of the player character in an initial screen or a scene after a scene change (for example, a new stage in the RPG), a non-player character or non-player characters to be displayed, an initial display position of each of the non-player characters (NPCs) to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 by the player (Step S104). Namely, the control section 11 determines whether or not instruction data for executing movement of the player character or the like are inputted from the keypad 30 via the input interface section 21. In the case where effective instruction data (that is, it means that such effective instruction data are instruction data that is allowed to be received by the control section 11) are inputted, the control section 11 receives the effective instruction data.

In the case where the control section 11 receives instruction data for instructing an action of the player character relating to the movement of the player character (that is, movement instruction data; a movement instruction by a movement command or the cross key (directional instruction key)) in accordance with the operation of the keypad 30 relating to the movement of the player character (movement operation) at Step S104 ("Yes" at Step S105), the control section 11 executes a movement process in accordance with the movement instruction data thus received (Step S106). In the movement process, the control section 11 causes the position of the player character to be moved in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, data on the size of a visual angle, and the like. The control section 11 then changes the setting content of the virtual camera. The movement information includes various kinds of information on the movement such as the position of the player character after the movement, the viewpoint position of the virtual camera, the direction of the visual axis, and the size of the visual angle changed along with the movement of the player character as well as the information on the movement of the player character. Then, the processing flow proceeds to Step S113.

In the case where the control section 11 receives instruction data for instructing an action for the player character relating to a battle (that is, battle instruction data: a battle command) in accordance with the operation of the keypad 30 by the player for instructing the action of the player character relating to a battle (a battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character to battle against) and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character that battles an enemy character in the battle process, the name of the enemy character, battle development information, battle result information, a parameter (or parameters) that defines the ability (or abilities) of the player character, and the like The battle information includes various kinds of information on the battle, such as the name of the player character that battles the enemy character, the name of the enemy character, battle development, battle result thereof, and a parameter that defines the ability of the player character. Then, the processing flow proceeds to Step S113.

In the case where the control section 11 receives instruction data for other instructions (that is, other instruction data: an other command) in accordance with the operation of the keypad 30 for executing other instruction (other operation) at Step S104 ("No" at Step S105, "No" at Step S108, and "Yes" at Step S111), the control section 11 executes a process (for example, a conversation between characters, a purchase action, a pick up action, and the like) in accordance with the other instruction data thus received (Step S112). The other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of the information indicating the action histories of the player character once stored in the RAM 12 (Step S114). More specifically, information required to be digitized is digitized using conversion tables prepared in advance. Further, with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character and the non-player characters to be displayed from the virtual camera onto the virtual screen in accordance with the setting contents of the virtual camera and the like. The control section 11 then executes a display process to generate a two-dimensional image to be displayed on the image display screen S1 (Step S115). When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the image display screen 51.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character and the three-dimensional non-player characters are included, from the coordinates of the world coordinate system to the coordinates of the viewpoint coordinate system. Subsequently, the control section 11 transmits the coordinates of the vertexes of the polygons of the player character and the non-player characters in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content Of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the image display screen 51. By switching images displayed on the image display screen 51 every single frame period, the player can see images including the state in which the player character and/or the non-player characters are moved on the field and perceive the images as moving images.

FIG. 3 is an explanatory drawing that shows an example of a weapon information managing table. The weapon information managing table is a table for setting multiple kinds of customizing items prepared in advance for each of various types of weapons with which the player character can be equipped.

Six types of weapons, that is, a sword (long), a sword (short), an axe, a handgun, a machine gun, and a spear are prepared in the present embodiment. Further, multiple kinds of items (customizing items) are prepared for customizing each of the various types of weapons.

As shown in FIG. 3, a weapon name indicating the type of weapon, a plurality of customizing items that can be set for customization, offensive power, and defensive power are set for each of the various types of weapons in the weapon information managing table so as to correspond to each other.

Figure 4:
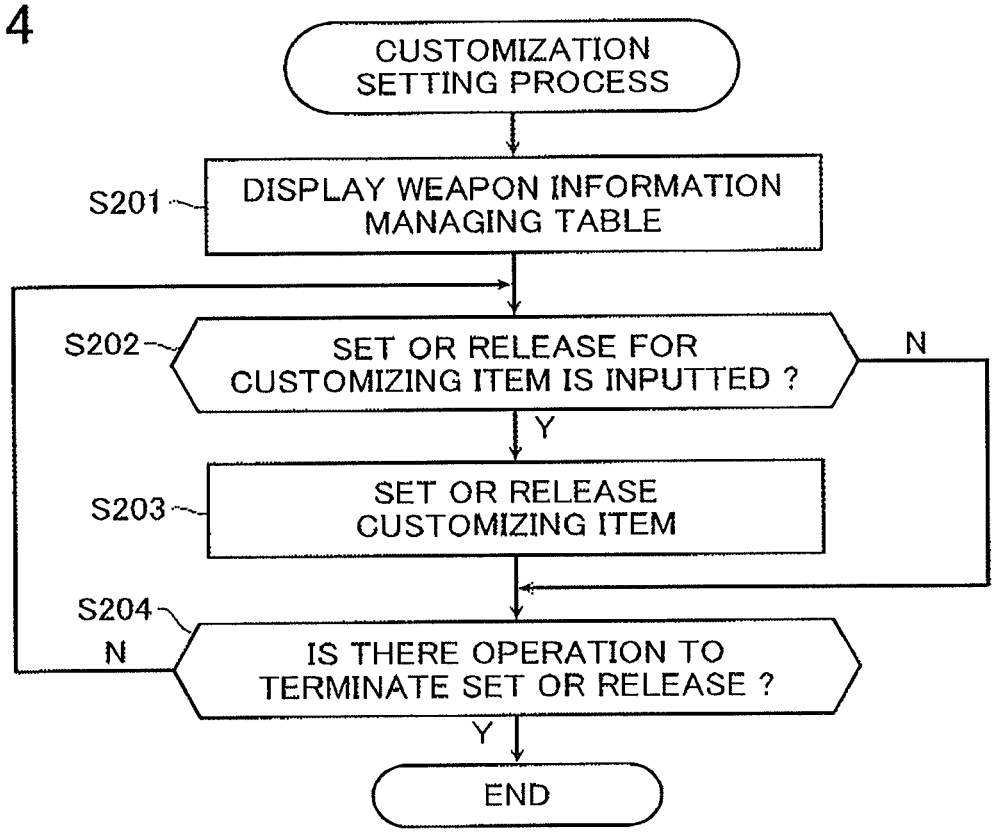
FIG. 4 is a flowchart that illustrates an example of a customization setting process.

Next, a customization setting process for setting customization of each of the weapons on the basis of input from the player will now be described with reference to FIG. 4. FIG. 4 is a flowchart that illustrates an example of the customization setting process that the video game apparatus 100 of the present embodiment may execute.

In the customization setting process, the control section 11 first causes the display device 50 to display the weapon information managing table on the image display screen 51 in response to a predetermined input operation to request customization setup by the keypad 30 from the player (Step S201) Subsequently, the control section 11 determines whether specification to set or release a customizing item is inputted or not (Step S202). In the case where it is determined that specification to set or release a customizing item is inputted by an input operation by the keypad 30 from the player, the control section 11 executes to set or release a customizing item thus specified (Step S203). On the other hand, in the case where it is determined that specification to set or release a customizing item is not inputted, the processing flow proceeds to Step S204. The control section 11 then determines whether or not termination to set or release the customization item is requested by the keypad 30 from the player (Step S204). In the case where it is determined that termination to set or release the customization item is requested, the control section 11 terminates the customization setting process. On the other hand, in the case where it is determined that termination to set or release the customization item is not requested, the processing flow returns to Step S202, and the control section 11 repeatedly executes the same processes.

In this case, a customizing item that is in a setup state, and a customizing item that is in a release state (that is, in a non-setup state) are distinguishably displayed in the weapon information managing table at Step S203. For example, they may be distinguishably displayed with color classification. Here, the "customizing item" is an item for applying an added value to a weapon. Such an item includes an item for improving ability of a weapon such as offensive power and defensive power, and an item for applying a decoration to a weapon in order to heighten the beauty of the weapon. For example, the player can obtain such an Item during progress of the video game. In the present embodiment, by utilizing such a customizing item, the player can customize the corresponding weapon.

Figure 5:
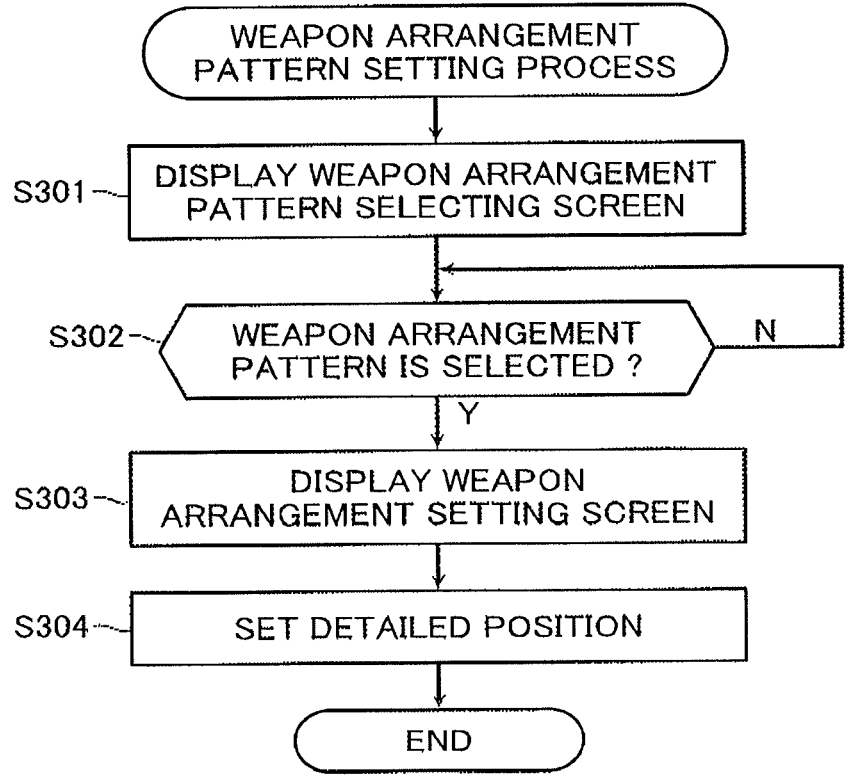
FIG. 5 is a flowchart that illustrates an example of a weapon arrangement pattern setting process.

Next, a weapon arrangement pattern setting process for setting an arrangement pattern of weapons in advance will be described with reference to FIG. 5. FIG. 5 is a flowchart that illustrates an example of the weapon arrangement pattern setting process.

Figure 6:
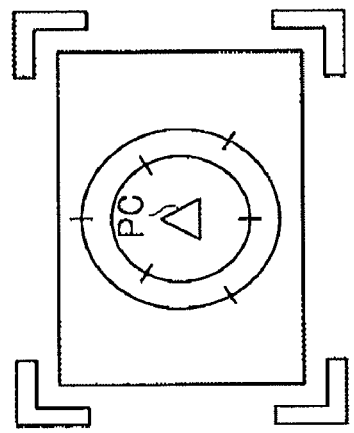
FIG. 6 is an explanatory drawing that shows an example of a weapon arrangement pattern selecting screen.
Figure 6:
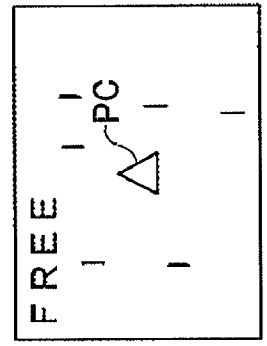
Figure 6:
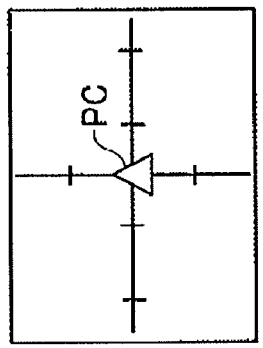
Figure 6:
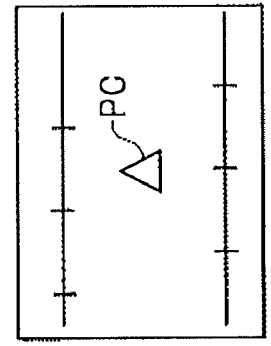
Figure 6:
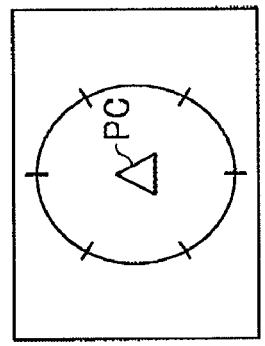
Figure 6:
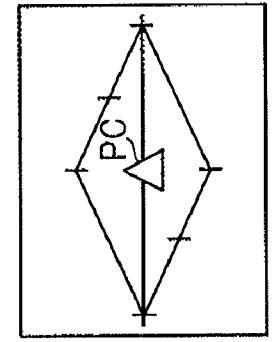
Figure 6:
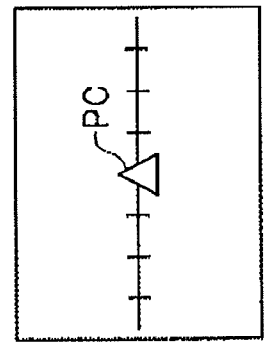
Figure 6:
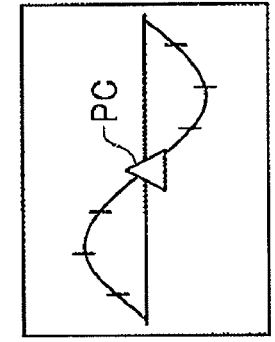

In the weapon arrangement pattern setting process, the control section 11 first causes the display device 50 to display a weapon arrangement pattern selecting screen shown in FIG. 6 on the image display screen 51 in response to a predetermined input operation to request of setup of a weapon arrangement pattern by keypad 30 from the player (Step S301). In the present embodiment, as shown in FIG. 6, eight types of weapon arrangement patterns are prepared, and a sample of each of the weapon arrangement patterns is displayed for indicating how weapons are arranged. More specifically, the eight types of weapon arrangement patterns include a weapon arrangement pattern in which weapons are arranged on a straight line, a weapon arrangement pattern in which weapons are arranged on a circle, a weapon arrangement pattern in which weapons are arranged on two circles, a weapon arrangement pattern in which weapons are arranged on a wavy line, a weapon arrangement pattern in which weapons are arranged on a rhomboid line, and a weapon arrangement pattern in which weapons are arranged at random. In the present embodiment, as shown in FIG. 6, a display position of each of six kinds of weapons and a display position of the player character PC are clearly demonstrated.

Figure 7:
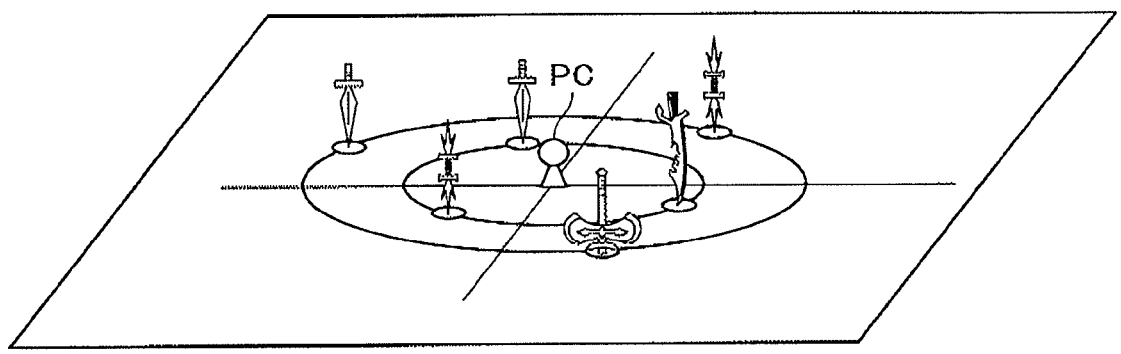
FIG. 7 is an explanatory drawing that shows an example of a weapon arrangement setting screen.

In the case where it is determined that any one of the weapon arrangement patterns is selected ("Yes" at Step S301), the control section 11 causes the display device 50 to display a weapon arrangement setting screen as shown in FIG. 7, for example, on the image display screen 51 on the basis of the selected weapon arrangement pattern (Step S303). The control section 11 then changes the display positions of each of the weapons on the weapon arrangement setting screen in response to an operation to set positions by the keypad 30 from the player, and sets details of the display position of each of the weapons (that is, a concrete position of each weapon) (Step S304). In this case, at Step S304, only arrangement of the plurality of weapons may just be set, or an arrangement position may be set for each of the types of weapons. Further, at Step S304, the size of each of the shapes on which the weapons can be arranged, which are initially set as samples, may be adjusted appropriately.

As described above, in the present embodiment, the player is caused to select a basic arrangement pattern among sample models, and the player further makes fine adjustments for the weapons based on the sample models thus displayed. The player can set an arrangement pattern of each of the weapons in this manner.

Figure 8:
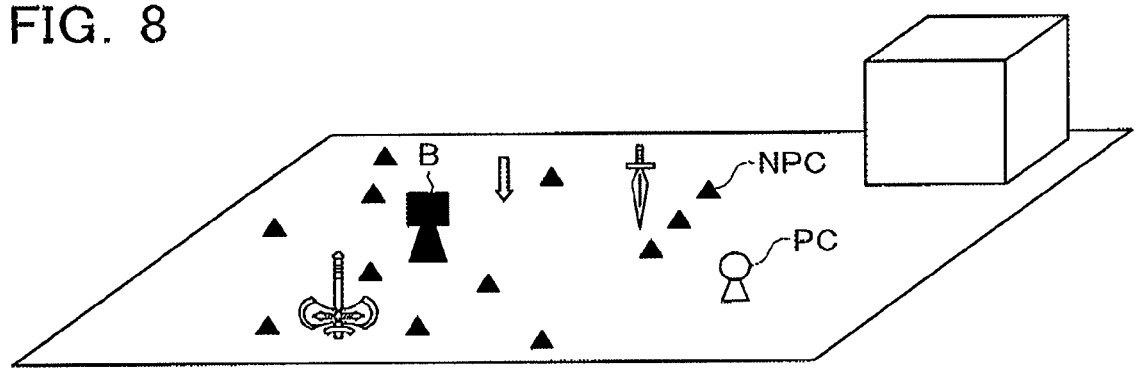
FIG. 8 is an explanatory drawing that shows another example of the weapon arrangement setting screen.

In this regard, in the present embodiment, when the player character executes a predetermined operation such as an operation of a specific button, a battle scene may be interrupted, and a battle screen may be changed to a weapon arrangement setting screen including simple map data of the battle scene. It is preferable that geographic information of the battle scene (such as slant and difference of elevation of the ground) and information on covered objects such as a building and a big rock are reflected in the weapon arrangement setting screen. Further, information on how any enemy character is arranged (where any enemy character is positioned) may be displayed on the weapon arrangement setting screen at the same time. Moreover, a display symbol of an enemy character to be displayed may be changed in accordance with strength and/or a rank of the enemy character. More specifically, for example, as shown in FIG. 8, with respect to a so-called boss character B, a method of displaying the boss character B with a specific display state or with a specific mark is thought so that the boss character B can be distinguished from any other enemy character than the boss character B. Since the display state of the enemy character is displayed in accordance with strength and/or a rank thereof, the player is allowed to consider more strategic weapon arrangement.

Figure 9:
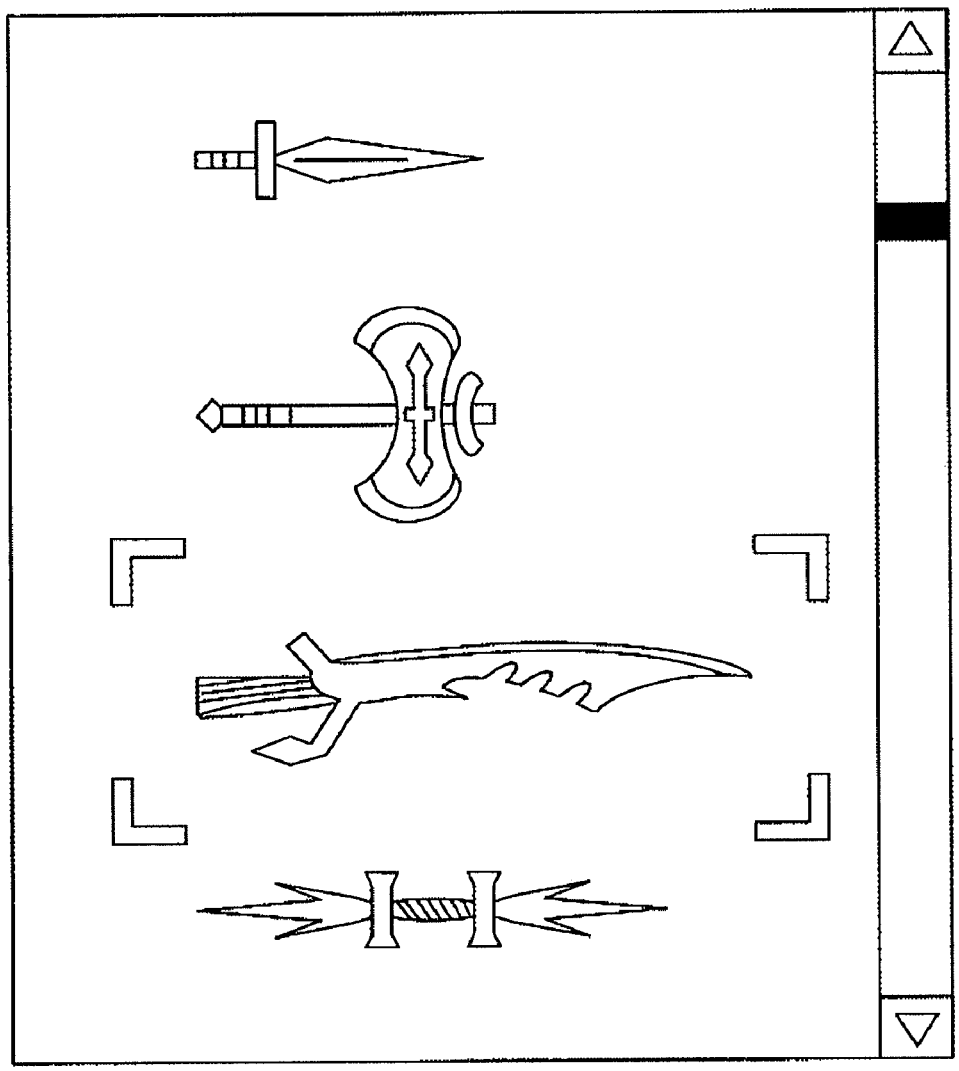
FIG. 9 is an explanatory drawing that shows an example of a tool selection menu.

Further, a weapon selection menu may be displayed along with the weapon arrangement setting screen at the same time. A weapon whose arrangement is next set is selected by moving a cursor or the like in the weapon selection menu. In this case, as shown in FIG. 9, the weapon specified by the cursor may be widely displayed compared with other weapons, by which the player can easily view detailed part of the displayed weapon. Further, main information on the displayed (specified) weapon such as a weapon name and offensive power may be displayed at the same time.

When the player select a weapon for which an arrangement setup is to be executed on the weapon selection menu, the cursor is displayed on the map in the weapon arrangement setting screen. The player operates this cursor arbitrarily to determine an arrangement position of the selected weapon. When the arrangement position is determined for the selected weapon, the selected weapon may be simplified and displayed as an icon at the arrangement position. By constructing the weapon arrangement setting screen in this manner, the player is allowed to recognize what type of weapon is arranged at any position to an extent only by viewing the map of the weapon arrangement setting screen. Thus, this makes it possible to improve operational efficiency of the player.

Further, in the case where the weapons that have been arranged as described above are not simplified and displayed, information for specifying a weapon (such as a weapon name, an ID number, a symbol and the like) may be displayed in the vicinity of the arranged weapon in order for the player to grasp a relationship between a weapon and an arrangement position thereof. Alternatively, such information may be displayed temporarily at least when a weapon (or an arrangement position thereof) is pointed out by the cursor. Moreover, the player may be allowed to revise an arrangement position of a weapon even in the case where the player determined the arrangement position of the weapon.

Figure 10:
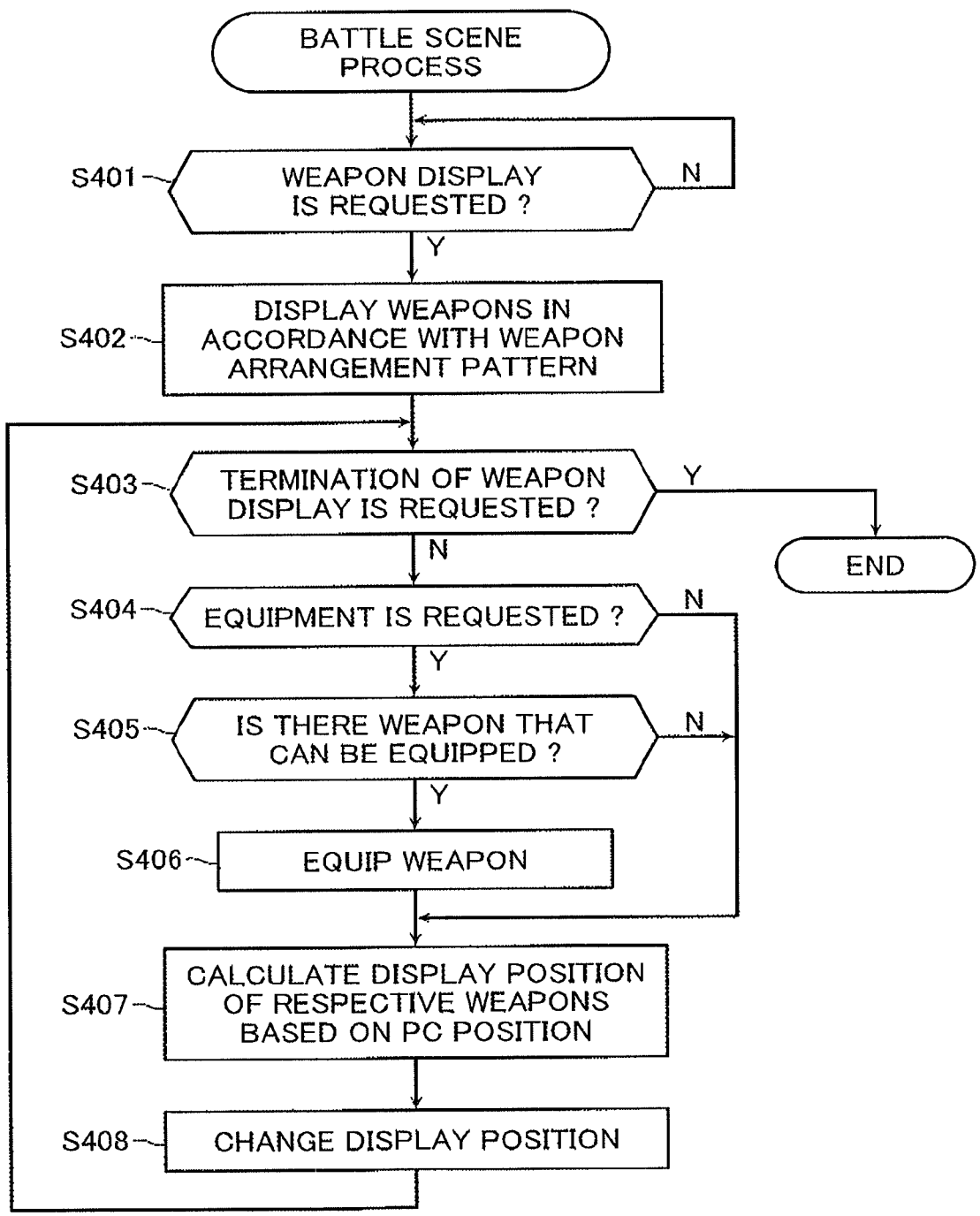
FIG. 10 is a flowchart that illustrates an example of a battle scene process.

Next, a battle scene process when the video game shifts to a battle scene in the present embodiment will be described with reference to FIG. 10. FIG. 10 is a flowchart that illustrates an example of the battle scene process. In this regard, since the battle scene process shown in FIG. 10 is used to explain a process of changing equipped weapon to another weapon, other processes of the battle scene are omitted.

In the battle scene process, the control section 11 first determines whether a predetermined input operation indicating request to display weapons by the keypad 30 from the player is received or not (Step S401). In the case where it is determined that the predetermined input operation is received, the control section 11 causes the display device 50 to display the respective weapons on the Image display screen 51 (Step S402). In this case, the respective weapons are displayed with the set weapon arrangement pattern, and customization information set in the weapon information managing table is added to each of the weapons.

Subsequently, the control section 11 continues to display the respective weapons on the image display screen 51 until the control section 11 receives a predetermined input operation indicating request to terminate display of the weapons by the keypad 30 from the player (Step S402).

In the state where the weapons are displayed on the image display screen 51, the control section 11 determines whether or not a predetermined input operation indicating request to equip the player character with a weapon is received by means of the keypad 30 from the player (Step S404). In the case where it is determined that the predetermined input operation is received, the control section 11 further determines whether there is a weapon with which the player character can be equipped or not (Step S405). In the case where it is determined that there is a weapon with which the player character can be equipped, the control section 11 causes the player character to be equipped with the weapon (Step S406).

In this case, the request to equip the player character with the weapon by operations of the player is specifically an operation signal inputted from an operation input device by means of an operation of a specific button (the same is true in request on the basis of operations of other player).

At Step S405, for example, the control section 11 determines that the player character can be equipped with a predetermined weapon in the case where the predetermined weapon is displayed within a predetermined distance from a display position (display standard position) of the player character and is the nearest weapon from the display position of the player character. Namely, such a predetermined weapon is determined to be a weapon with which the player character can be equipped. In this case, a standard point of the display position (that is, the display standard position) of the player character is a predetermined point such as a specific point on a central axis of the player character and a point at which a specific part of the player character such as the tip of a finger of a dominant hand is positioned.

The control section 11 may execute the process at Step S405 before the process at Step S404. In this case, the control section 11 may inform (or announce) the player of a weapon so that the player can recognize such a weapon can be equipped for the player character. Then, when the control section 11 receives request to equip the player character with such a weapon at Step S404, the processing flow may proceed to Step S406. For example, by highlighting, flashing such a weapon, or changing the color of a weapon, or displaying identification (or indication) in the vicinity of a weapon to indicate that the player character can be equipped with the weapon, a display state of the weapon with which the player character can be equipped may be differentiated from display states of other weapons. Alternatively, such a weapon may be informed by means of a voice. Further, a weapon with which the player character cannot be equipped may be informed so that the player can recognize such a situation (for example, by displaying such a weapon in a dotted line, or displaying a dotted line so as to enclose such a weapon).

Subsequently, the control section 11 calculates a display position of each of the weapons based on the display position of the player character (Step S407). The control section 11 then changes the display position of each of the weapons in accordance with the calculated results (Step S408). At Step S407, the control section 11 refers to the weapon arrangement pattern thus set, and calculates the display position of each of the weapons in consideration of a distance between the player character and each of the weapons and a direction from the display standard position of the player character to a display position of each of the weapons.

In this regard, the processes at Steps S407 and S408 are executed in the case where a predetermined display method is set so that the display position of each of the weapons is moved along with movement of the player character. However, in the case where another display method is set so that the display position of each of the weapons is fixed regardless of movement of the player character, the processes at Steps S407 and S408 are not executed. Such a display method may be set in accordance with setup request of a display method by the keypad 30 from the player during the weapon arrangement pattern setting process, for example.

Figure 11A:
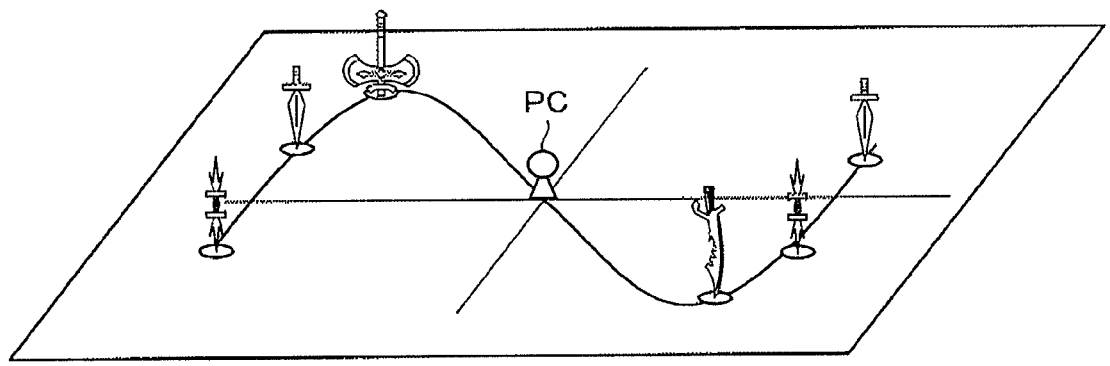
FIG. 11 is an explanatory drawing that shows an example of a battle screen in the case where a display state of weapons are set so that a display position of each of the weapons is fixed regardless of movement of the player character.
Figure 11B:
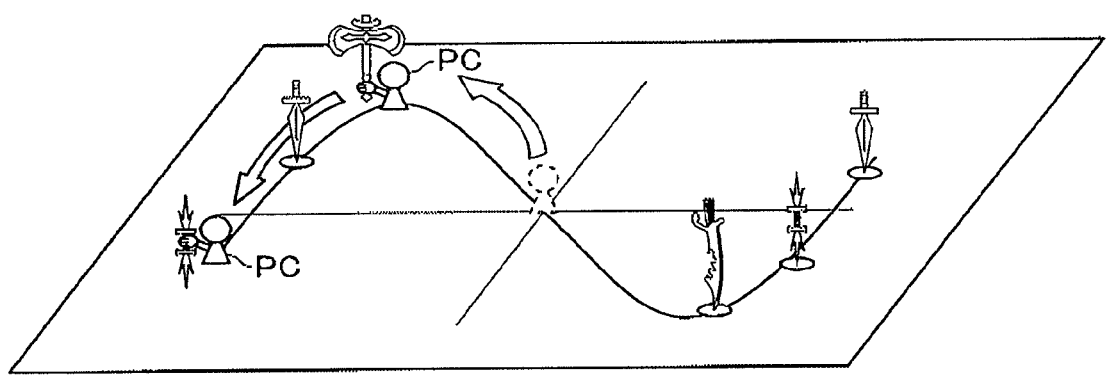

In the case where a display method is set so that the display position of each of the weapons is fixed regardless of movement of the player character, the processes as shown in FIG. 11 may be executed. Namely, it is assumed that the player character PC moves from the display state shown in FIG. 11A to the display state shown in FIG. 11B, for example. The displayed weapons lay in a fixed position in the virtual space without causing the display position of each of the weapons to be moved as shown in FIG. 11I. For this reason, the player can be equipped with any weapon only moving to an arrangement position of the weapon that the player desires to use.

Figure 12A:
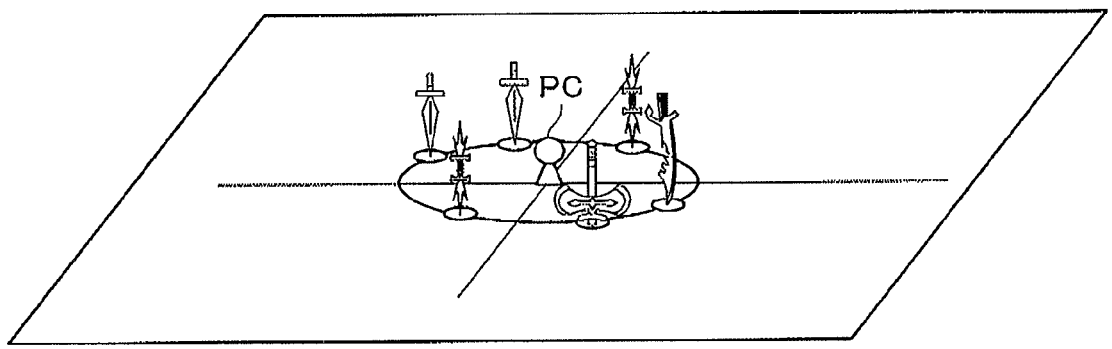
FIG. 12 is an explanatory drawing that shows an example of a battle screen in the case where a display state of weapons are set so that a display position of each of the weapons is moved along with movement of the player character.
Figure 12B:
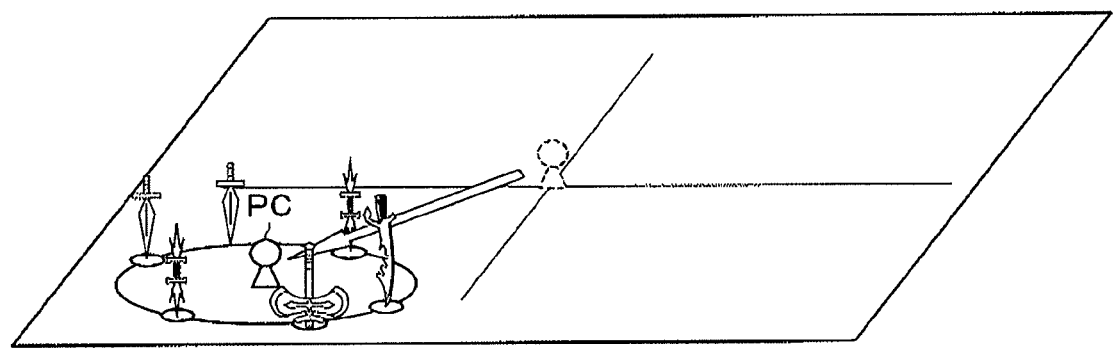

On the other hand, in the case where another display method is set so that the display position of each of the weapons is moved along with movement of the player character, the processes as shown in FIG. 12 may be executed. Namely, it is assumed that the player character PC moves from the display state shown in FIG. 12A to the display state shown in FIG. 12B, for example. As shown in FIG. 12B, the displayed weapons are moved along with movement of the player character while a distance between the player character and each of the displayed weapons and a direction from the player character are maintained (that is, while a positional relationship between the player character and each of the displayed weapons is maintained). Thus, in an arrangement pattern in which this display method can be selected, each of the weapons are arranged near the display position of the player character PC (that is, within a distance at which it is determined that the player character can be equipped with a weapon).

As described above, in the embodiment described above, the video game apparatus 100 is constructed as follows. Namely, the control section 11 sets an added value to a weapon for customizing the weapon stored as weapon information in a weapon information managing table in response to customization request by operations of the player. In this case, a plurality of weapons are stored in the weapon information managing table, and the player character can be equipped with any of the weapons among the plurality of weapons. The control section 11 reads out the weapon information from the weapon information managing table in response to display request of a weapon by operations of the player, and then causes the display device 50 to display one or more weapon in a battle screen displayed on the image display screen 51. In this case, the weapon information thus read out indicates the one or more weapon. The control section 11 equips the player character with a weapon with which the player character can be equipped among the one or more weapon thus displayed. Thus, it is possible to select a weapon without displaying a menu screen and this makes it possible to use the selected weapon in real time and immediately. Further, it is possible to heighten realism in a battle scene in the video game such as a RPG, and this makes it possible to improve interest of the player in the video game. Moreover, it is possible to reflect the weapon customized by the player in the battle screen, and this makes it possible to increase interest of the player in the video game.

Further, for example, in the scene to select a weapon in the battle screen of the RPG, it is possible to select a weapon and exchange weapons more rapidly without setting a weapon to be equipped on a dedicated menu screen. This makes it possible to increase realism of the battle scene. In addition, the player can consider strategy of a weapon arrangement (for example, which weapon is displayed and where such a weapon is displayed), and this makes it possible to heighten interest of the player in the video game.

Moreover, in the embodiment described above, the video game apparatus 100 is constructed so that the control section 11 causes the display device 50 to display a plurality of weapons in the battle screen at the same time in which multiple kinds of weapon information stored in the weapon information managing table respectively indicate the plurality of weapons. In the conventional video game apparatus, the number of weapon that the player can select at one attack is limited to only one kind, and the player is required to instruct to change weapons on the menu screen in the case where the weapon is to be changed to another. However, since the plurality of weapons are displayed on the battle screen a the same time in the video game apparatus 100 of the present invention, it is possible to shift (change) a weapon to another weapon smoothly without bringing up the menu screen. This makes it possible to heighten realism (realistic sensation) of the video game.

Furthermore, in the embodiment described above, the video game apparatus 100 is constructed so that the control section 11 sets an arrangement pattern of the weapons when the weapons are displayed in the battle screen in response to request to set an arrangement pattern of weapons by operations of the player, and causes the display device 50 to display the weapons in the battle screen with the arrangement pattern thus set. Thus, not only it is possible to bring up the plurality of weapons in the battle screen at the same time, but also the player can arbitrarily execute a setup as to "in what display state the weapons are displayed".

Further, in the embodiment described above, the video game apparatus 100 is constructed so that the control section 11 determines an arrangement pattern to be utilized among a plurality of arrangement patterns for specifying an arrangement position of each of the weapons, and causes the display device 50 to display the plurality of weapons in the battle screen on the basis of the arrangement pattern indicating that the plurality of weapons are displayed in the battle screen with a predetermined positional relationship. Thus, the player can arbitrarily execute a setup as to in what arrangement pattern the weapons are displayed. Therefore, by arranging the weapons in advance in accordance with a battle style desired by the player, it is possible to cause the player character to act in the battle scene effectively, and this makes it possible to heighten interest of the player in the video game.

Moreover, in the embodiment described above, the video game apparatus 100 is constructed so that the control section 11 causes the display device 50 to display the plurality of weapons at respective display positions in the battle screen based on a display position of the player character in accordance with the arrangement pattern thus determined, and then to maintain the respective display positions of the plurality of weapons even in the case where the player character moves in the battle screen. Thus, the player can equip the player character with any weapon to battle an enemy character by appropriately changing one another in the plurality of weapons displayed in the battle screen in accordance with the arrangement pattern selected by the player himself. Therefore, for example, the player character can battle enemy characters while changing the weapons by moving between the plurality of displayed weapons. In particular, a skilled player can enjoy close direction effect of sword fight, Furthermore, in the embodiment described above, the video game apparatus 100 is constructed so that the control section 11 causes the display device 50 to display the plurality of weapons at respective display positions in the battle screen based on a display position of the player character in accordance with the arrangement pattern thus determined, and then to move the respective display positions of the plurality of weapons along with movement of the player character when the player character moves in the battle screen. Thus, it is possible to constantly arrange the weapons near the player character even when the player character moves, and this makes it possible to increase variation of the video game.

In this regard, arrangement position information is set in each of the plurality of arrangement patterns in the embodiment described above. In this case, the arrangement position information indicates an arrangement position (that is, a distance and a direction from the player character) of each of the plurality of weapons based on a display position of the player character. The display position of each of the weapons is determined on the basis of the arrangement position information.

Further, in the embodiment described above, the video game apparatus 100 is constructed so that the control section 11 calculates a display position of each of the plurality of weapons based on the display position of the player character in the battle screen in accordance with the arrangement position information set in the arrangement pattern. Thus, it is possible to determine (derive) the display position of each of the weapons on the basis of the display position of the player character.

Moreover, in the embodiment described above, the video game apparatus 100 is constructed so that a standard point of the display position of the player character is set to a point at which a specific part of the player character such as the tip of a finger of a dominant hand is positioned. In this case, when the player character extends his hand to grab a weapon, the weapon nearest from the tip of a finger of the extended hand is selected and equipped for the player character. This makes it possible to expect an image having reality.

Furthermore, in the embodiment described above, the video game apparatus 100 is constructed so that the control section 11 announces that the player character can be equipped with a predetermined weapon in the case where the predetermined weapon is displayed within a predetermined distance from a display position of the player character and is the nearest weapon from the display position of the player character, and the player character is equipped with the weapon when equipment request of the announced weapon is received as the equipment request of a weapon with which the player character can be equipped. Thus, the player character can be equipped with the weapon that is displayed within a predetermined distance from a display position of the player character and is the nearest weapon from the display position of the player character.

Further, although the present invention has been explained using the weapons as an example of the battle tool in the embodiment described above, the video game apparatus 100 may be constructed so that the control section 11 sets other battle tools such as a protector and controls them in the similar manner.

Moreover, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention.

Furthermore, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Further, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Moreover, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image displayer to display a player character to be movable on a field of a video game displayed on an image display screen of the image displayer, the video game processing apparatus controlling progress of a video game by controlling an action of the player character to be displayed on the image display screen in accordance with operations by a player, the video game processing apparatus comprising:

a storage area that stores a battle tool information managing table in which battle tool information showing a plurality of battle tools with which the player character is to be equipped is set, the battle tools including at least one of a weapon and a protector;

a battle tool display position calculator that, in response to a display state set request based on the operations of the player, calculates in what positional relationship the plurality of battle tools is set by determining which one of a plurality of arrangements patterns is used, calculates in which arrangement positions of the determined arrangement pattern the images of the battle tools are displayed, and calculates display position information of each of the plurality of battle tools based on the arrangement positions of the images of the battle tools in the determined arrangement pattern;

a display state setter that sets a display state of the images of the plurality of battle tools to be displayed on a battle screen based on the display position information calculated by the battle tool display position calculator;

a battle tool display controller that reads out the battle tool information set to the battle tool information managing table in response to a display request by the operations of the player, the battle tool display controller causing the image displayer to display the images of the battle tools indicated by the battle tool information thus read out with the display state determined by the display state setter, the images of the battle tools being displayed on the battle screen with reference to a display position of the player character;

an equipment request receiver that determines the battle tools which are able to be equipped by the player character by determining the battle tools that are displayed in the determined arrangement pattern within a predetermined distance from the display position of the player character on the battle screen, and that receives an equipment request by the operation of the player with respect to the battle tools capable of being equipped; and a battle tool equipper that equips the player character with one of the battle tools in response to the equipment request receiver receiving the equipment request, wherein the display state setter is configured to change the arrangement positions of the images of the battle tools with respect to one another in the determined arrangement pattern in accordance with the display state set request based on the operations of the player, wherein the player character moves, on the battle screen in accordance with the operations of the player, toward one of the images of one of the battle tools for decreasing a distance between the player character and the one of the images for determining, with the equipment request receiver, that the player character is able to be equipped with the one of the battle tools, and wherein the player character has previously possessed, during the progress of the video game, at least one of the plurality of battle tools that is displayed in the determined arrangement pattern that is set based on the operations of the player, the player character being able to be equipped with the previously possessed one of the plurality of battle tools by moving within the predetermined distance of the corresponding one of the images of the previously possessed one of the battle tools.

2. The video game processing apparatus according to claim 1, wherein the battle tool display controller causes the image displayer to display the images of the plurality of battle tools shown by the battle tool information stored in the battle tool information management table at the same time.

3. The video game processing apparatus according to claim 1, wherein the battle tool display controller causes the image displayer to display the images of the battle tools on the battle screen based on the display position of the player character displayed on the battle screen in accordance with the arrangement pattern determined by the display state setter, and to maintain display positions of the images of the plurality of battle tools on the battle screen even when the player character moves in the battle screen.

4. The video game processing apparatus according to claim 1, wherein a standard point of the display position of the player character includes a specific point on a central axis of the player character and a point at which a predetermined part of the player character is positioned.

5. The video game processing apparatus according to claim 1, wherein the equipment request receiver causes the image displayer to accept the battle tools to which the image is displayed at a position nearest to the position where the player character is displayed as the equipment request of the battle tools capable of being equipped.

6. The video game processing apparatus according to claim 1, further comprising:
an equipped possible battle tool annunciator that announces the battle tools which are able to be equipped by the player character,
wherein the equipment request receiver receives only equipment requests of a battle tool announced by the equipped battle tool annunciator as the equipment request.

7. The video game processing apparatus according to claim 1, wherein the battle tool information includes a customizing item to customize the battle tools, and further comprises a customizing setter that sets the customizing item to the battle tool information in order to customize the battle tools shown by the battle tool information in accordance with a predetermined request customization operation by the operation of the player.

8. The video game processing apparatus according to claim 2, wherein the battle tool display controller causes the image displayer to display the images of the battle tools on the battle screen based on the display position of the player character displayed on the battle screen in accordance with the arrangement pattern determined by the display state setter, and to maintain display positions of the images of the plurality of battle tools on the battle screen even when the player character moves in the battle screen.

9. The video game processing apparatus according to claim 2, wherein a standard point of the display position of the player character includes a specific point on a central axis of the player character and a point at which a predetermined part of the player character is positioned.

10. The video game processing apparatus according to claim 3, wherein a standard point of the display position of the player character includes a specific point on a central axis of the player character and a point at which a predetermined part of the player character is positioned.

11. The video game processing apparatus according to claim 2, wherein the equipment request receiver causes the image displayer to accept the battle tools to which the image is displayed at a position nearest to the position where the player character is displayed as the equipment request of the battle tools capable of being equipped.

12. The video game processing apparatus according to claim 3, wherein the equipment request receiver causes the image displayer to accept the battle tools to which the image is displayed at a position nearest to the position where the player character is displayed as the equipment request of the battle tools capable of being equipped.

13. The video game processing apparatus according to claim 2, further comprising:
an equipped possible battle tool annunciator that announces the battle tools which are able to be equipped by the player character,
wherein the equipment request receiver can receive only equipment requests of a battle tool announced by the equipped battle tool annunciator as the equipment request.

14. The video game processing apparatus according to claim 3, further comprising:
an equipped possible battle tool annunciator that announces the battle tools which are able to be equipped by the player character,
wherein the equipment request receiver can receive only equipment requests of a battle tool announced by the equipped battle tool annunciator as the equipment request.

15. The video game processing apparatus according to claim 2, wherein the battle tool information includes a customizing item to customize the battle tools, and further comprising a customizing setter that sets the customizing item to the battle tool information in order to customize the battle tools shown by the battle tool information in accordance with a predetermined request customization operation by the operation of the player.

16. The video game processing apparatus according to claim 3, wherein the battle tool information includes a customizing item to customize the battle tools, and further comprising a customizing setter that sets the customizing item to the battle tool information in order to customize the battle tools shown by the battle tool information in accordance with a predetermined request customization operation by the operation of the player.

17. The video game processing apparatus according to claim 1, wherein the images of the battle tools are fixedly displayed on the battle screen irrespective of changes in the display position of the player character.

18. The video game processing apparatus according to claim 2, wherein the images of the battle tools are fixedly displayed on the battle screen irrespective of changes in the display position of the player character.

19. A non-transitory computer readable storage medium that stores a program for processing a video game, progress of the video game being controlled by causing an image displayer to display a player character moveable on the field of the video game displayed on an image display screen of the image displayer, and controlling an action of each character to be displayed on the image display screen in accordance with operations by a player, the computer readable medium comprising:

a storing code segment that stores a battle tool information managing table in which battle tool information showing a plurality of battle tools with which the player character is to be equipped is set, the battle tools including at least one of a weapon and a protector;

a display position calculating code segment that, in response to a display state set request based on the operations of the player, calculates in what positional relationship the plurality of battle tools is set by determining which one of a plurality of arrangements patterns is used, calculates in which arrangement positions of the determined arrangement pattern the images of the battle tools are displayed, and calculates display position information of each of the plurality of battle tools based on the arrangement positions of the images of the battle tools in the determined arrangement pattern;

a setting code segment that sets a display state of the images of the plurality of battle tools to be displayed on a battle screen based on the display position information calculated by the display position calculating code segment;

a reading code segment that reads out the battle tool information set to the battle tool information managing table in response to a display request by the operations by the player, a battle tool displayed controller causing the image displayer to display the images of the battle tools indicated by the battle tool information thus read out with the display state determined by the setting code segment, the images of the battle tools being displayed on the battle screen with reference to a display position of the player character;

a judging code segment that determines the battle tools which are able to be equipped by the player character by determining the battle tools that are displayed in the determined arrangement pattern within a predetermined distance from the display position of the player character on the battle screen, and that receives an equipment request by the operation of the player with respect to the battle tools capable of being equipped; and an equipping code segment that equips the player character with one of the battle tools in response to an equipment request receiver receiving the equipment request, wherein the setting code segment is configured to change the arrangement positions of the images of the battle tools with respect to one another in the determined arrangement pattern in accordance with the display state set request based on the operations of the player, wherein the player character moves, on the battle screen in accordance with the operations of the player, toward one of the images of one of the battle tools for decreasing a distance between the player character and the one of the images for determining, with the judging code segment, that the player character is able to be equipped with the one of the battle tools, and wherein the player character has previously possessed, during the progress of the video game, at least one of the plurality of battle tools that is displayed in the determined arrangement pattern that is set based on the operations of the player, the player character being able to be equipped with the previously possessed one of the plurality of battle tools by moving within the predetermined distance of the corresponding one of the images of the previously possessed one of the battle tools.

20. The computer readable medium according to claim 19, wherein the images of the battle tools are fixedly displayed on the battle screen irrespective of changes in the display position of the player character.

* * * * *